United States Patent
Krishnamurthy et al.

(10) Patent No.: US 8,098,686 B1
(45) Date of Patent: Jan. 17, 2012

(54) METHOD AND APPARATUS FOR PROVIDING AN APPLICATION-LEVEL UTILITY METRIC

(75) Inventors: Balachander Krishnamurthy, New York, NY (US); Oliver Spatscheck, Randolph, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 666 days.

(21) Appl. No.: 11/566,084

(22) Filed: Dec. 1, 2006

Related U.S. Application Data

(60) Provisional application No. 60/741,983, filed on Dec. 2, 2005.

(51) Int. Cl.
 *H04J 3/00* (2006.01)
(52) U.S. Cl. ............... 370/469; 455/422.1; 455/423; 455/424; 455/425
(58) Field of Classification Search .......... 370/464, 370/465, 469, 474; 455/403, 405–406, 422.1, 455/423–425
See application file for complete search history.

(56) References Cited

U.S. PATENT DOCUMENTS

| | | | | |
|---|---|---|---|---|
| 4,792,753 A | * | 12/1988 | Iwai | 370/244 |
| 5,535,199 A | * | 7/1996 | Amri et al. | 370/392 |
| 6,460,050 B1 | * | 10/2002 | Pace et al. | 707/104.1 |
| 6,606,320 B1 | * | 8/2003 | Nomura et al. | 370/395.1 |
| 6,701,363 B1 | * | 3/2004 | Chiu et al. | 709/224 |
| 2001/0023454 A1 | * | 9/2001 | Fitzgerald | 709/233 |
| 2002/0147937 A1 | * | 10/2002 | Wolf | 714/4 |
| 2004/0122903 A1 | * | 6/2004 | Saulpaugh et al. | 709/206 |
| 2004/0196860 A1 | * | 10/2004 | Gao et al. | 370/437 |
| 2004/0215757 A1 | * | 10/2004 | Butler | 709/223 |
| 2007/0061443 A1 | * | 3/2007 | Chavda | 709/224 |

* cited by examiner

*Primary Examiner* — Hassan Kizou
*Assistant Examiner* — Charles C Jiang

(57) ABSTRACT

A method and apparatus for providing an application utility metric for an application by taking into account of multiple protocols used by the application as well as at least one interaction of the application at the application-level that is deemed to be useful are disclosed. For example, the method computes a protocol overhead of one or more underlying Internet Protocol suite protocols supporting the application. The method also computes an application-level overhead based on at least one application-level interaction. Finally, the method computes the application-level utility metric in accordance with the protocol overhead and the application-level overhead.

14 Claims, 4 Drawing Sheets ns

US 8,098,686 B1

METHOD AND APPARATUS FOR PROVIDING AN APPLICATION-LEVEL UTILITY METRIC

This application claims the benefit of U.S. Provisional Application No. 60/741,983 filed on Dec. 2, 2005, which is herein incorporated by reference.

The present invention relates generally to Internet analytics and, more particularly, to a method for enabling an application-level utility metric for a wide variety of Internet based applications.

BACKGROUND OF THE INVENTION

There has been a great deal of previous efforts in examining specific protocol utility metric, such as overhead introduced by protocol headers. For instance, in Web based applications, Hypertext Transfer Protocol (HTTP) headers in these applications are considered overhead. Compression techniques, among other methods, have been applied to HTTP protocol headers to lower the overall protocol overhead and, hence, to increase the overall efficiency of the HTTP protocol. Protocol overhead, therefore, can be used to compute the specific protocol utility metric of a particular protocol based on the fraction of transferred data actually used. However, previous efforts in specific protocol utility metric for Internet based applications focus only on a particular protocol supporting these Web based applications. In reality, a Web based application typically involves multiple protocols to deliver the functionality of the application and there are many application-level client server or peer-to-peer interactions. Increasing the efficiency of a specific protocol, such as protocol header overhead, in an application may indeed increase the efficiency of an application; however, it does not greatly improve or accurately capture the overall efficiency of an application at the application-level.

Therefore, a need exists for a method for providing an application-level utility metric in Internet based applications.

SUMMARY OF THE INVENTION

In one embodiment, the present invention provides an application utility metric for an application by taking into account of multiple protocols used by the application as well as at least one interaction of the application at the application-level that is deemed to be useful. For example, the method computes a protocol overhead of one or more underlying Internet Protocol suite protocols supporting the application. The method also computes an application-level overhead based on at least one application-level interaction. Finally, the method computes the application-level utility metric in accordance with the protocol overhead and the application-level overhead.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
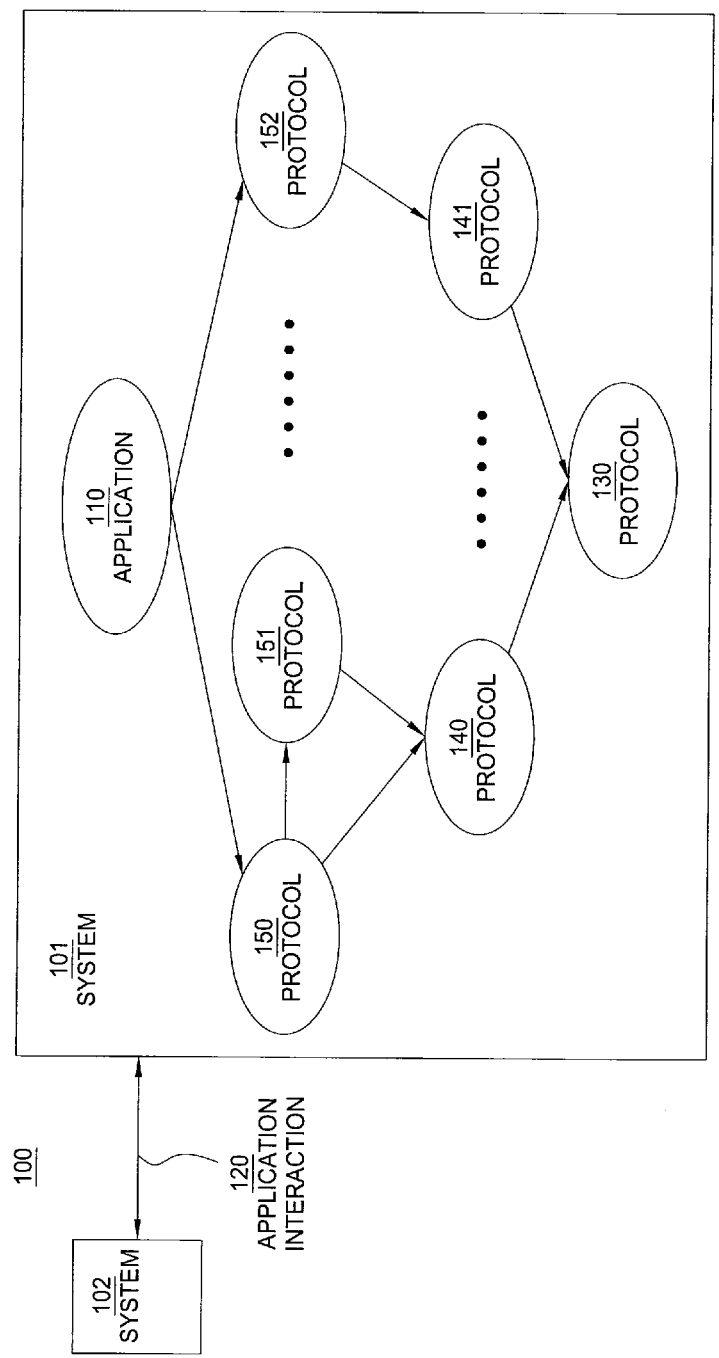
FIG. 1 illustrates an example of application and protocol relationships related to the present invention.

There has been a great deal of previous efforts in examining specific protocol utility metric, such as overhead introduced by protocol headers. However, previous efforts in specific protocol utility metric for Internet based applications focus only on a particular protocol supporting these Web based applications. In reality, a Web based application typically involves multiple protocols to deliver the functionality of the application and there are many application-level client server or peer-to-peer interactions. Increasing the efficiency of a specific protocol, such as protocol header overhead, in an application may indeed increase the efficiency of an application; however, it does not significantly improve or accurately capture the overall efficiency of an application at the application-level. The overall application efficiency, or application-level protocol utility metric, taking into account of all protocols supporting an Internet based application as well as the client server or the peer-to-peer interactions of an application at the application-level have been overlooked.

A peer-to-peer (P2P) network is a network that relies primarily on the computing and network resources of the participants, peer-to-peer systems, in the network rather than concentrating it in a relatively low number of servers. A client server network is a network which separates a client system, often running an Internet based application, from a server system. Each instance of the client system application can send requests to the server system to access or utilize resources residing in the server system. An Internet based application is an application that uses one or more layer 3 to layer 5 Internet Protocol suite protocols to support the functions of the application. For instance, layer 3, the network layer, Internet based protocols include, but are not limited to, IP and Internet Control Message Protocol (ICMP); layer 4, the transport layer, Internet based protocols include, but are not limited to, TCP, UDP, and Resource Reservation Protocol (RSVP); layer 5, the application layer, Internet based protocols include, but are not limited to, HTTP, DNS, SMTP, File Transfer Protocol (FTP), and Session Initiation Protocol (SIP) just to name a few.

To address this need, the present invention enables the use of an application utility metric on Internet based applications by taking into account of multiple protocols used by the applications as well as the client server or the peer-to-peer interactions of the applications at the application-level to compute the fraction of the overall traffic due to the application that is actually useful. The usefulness of the traffic can be defined according to particular applications and user requirements. The present invention, in addition to computing protocol specific protocol header overhead, also takes into consideration application-level interactions to characterize the overall usefulness of the overall traffic due to an Internet based application.

In one embodiment, the application-level utility metric not only can be used to provide a more accurate efficiency assessment of an application at the application-level, but it can also be used as a benchmark against different implementations of a particular type of application to compare the overall efficiency of the different implementations. For example, the present invention can be used to reduce unwanted traffic that can benefit the network, improve efficiency of the application, and lead to reduced user perceived latency. The present invention can also be used to ensure that the application-level utility metric is given direct and early consideration in the construction of new applications or extensions of existing ones.

To better understand the present invention, FIG. 1 illustrates an example 100 of application and protocol relationships related to the present invention. In FIG. 1, application 110 is an Internet based application. Application 110 uses a number of Internet Protocol suite protocols to support the overall functionality of the application. For instance, application 110 uses protocol 150 and protocol 152 directly. In turn, protocol 150 may use protocol 151 and protocol 140 to directly support application 110. Protocol 151 may also use protocol 140 to indirectly support application 110. Protocol 152 uses protocol 141 to directly support application 110. In turn, protocol 140 and protocol 141 may use protocol 130 to indirectly support application 110. In summary, in order to deliver the full functionality of application 110, the application requires the use of a number of underlying protocols directly or indirectly. Note that protocol 150, 151, and 152 can be layer 5 Internet Protocol suite protocols; protocol 140 and 141 can be layer 4 Internet Protocol suite protocols; and protocol 130 can be a layer 3 Internet Protocol suite protocol.

In order to assess, at the application-level, the fraction of the overall traffic due to application 110 that is actually useful, the application-level interactions between system 101, in which application 110 resides, and system 102 as well as the protocol overhead of all the underlying protocols need to be considered. Note that system 101 and system 102 may exchange traffic using application interaction flow 120. The application interaction can be a client-server based exchange or a peer-to-peer exchange.

To illustrate the benefits of the application-level utility metric based on the model of example 100 shown in FIG. 1, the use of the application-level utility metric on a number of popular Internet based applications and protocols are first described.

In one embodiment of the present invention, using the DNS protocol as an example application executed on a DNS client, a significant number of DNS queries are generated in order to allow users to set up DNS mappings with various servers on the Internet. It is currently not feasible to indicate what fraction of an application's time is spent in unnecessary DNS queries. For instance, a particular DNS mapping changes infrequently and the time to live value of the DNS mapping has been set to a short period of time; therefore, the application has to frequently issue DNS requests to resolve the same DNS mapping that expires frequently in the DNS mapping cache due to the short time to live setting. Therefore, the application-level utility metric can be defined to characterize the application-level usefulness of the DNS protocol by taking into account of the time spent by an application in unnecessary queries and the protocol overhead of the DNS protocol. For instance, the number of DNS requests that result in the same DNS mapping as the previous mapping can be considered overhead at the application-level and the DNS protocol header can be considered overhead at the protocol level. If the DNS protocol header overhead is 5% (0.95) and 40% (0.6) of the DNS request is unnecessary, then the overall DNS utility metric becomes 57% (0.95×0.6).

In addition, the DNS client relies on the underlying User Datagram Protocol (UDP) to communicate with DNS servers. In turn, the UDP protocol relies on the underlying Internet Protocol (IP) to communicate information with DNS servers. There is additional protocol overhead in the underlying protocols, such as UDP and IP, supporting the DNS protocol as an application.

In another embodiment of the present invention, we use a Web server application as an example. In this example the application-level utility metric can be defined as the actual amount of useful content transmitted divided by the amount of network traffic generated by the server. For example, a Web server might transmit a 10 Kbyte image to 10 legitimate users. While transmitting this legitimate traffic the server also served requests for unavailable objects and added transmission overheads by encoding the images into the HTTP and IP protocols. This might have lead to 400 KByte worth of network traffic. Therefore, the utility of this Web server is 10 Kbyte*10/400 Kbyte=25%.

In addition, the Web server application uses the HTTP protocol to exchange traffic with Web clients. The HTTP protocol also relies on the underlying Transmission Control Protocol (TCP) to communicate information to the remote Web client. In addition, the TCP protocol relies on the underlying Internet Protocol (IP) to communicate information to the remote Web client. There is additional protocol overhead in the underlying protocols, such as TCP and IP, supporting the Web server application using the HTTP protocol.

In another embodiment of the present invention, using Web server application again as a different example, a Web server typically receives numerous requests from Web crawlers that crawl a site in order to generate reverse indices at various search engine sites. All such traffic is currently treated as benign under the assumption that users on the Internet will issue search strings and reach the pages on a Web site. In many cases it is possible to see if the users reached a page due to a search. The application-level utility metric can be defined to indicate the fraction of accesses that is due to searches as well as the fraction of traffic exchanged due to useful traffic with the HTTP header overhead removed and thus indicate the effectiveness of crawling of the Web site. A Web crawler is a program which browses the World Wide Web in a methodical and automated manner. This process is called Web crawling. For instance, the fraction of accesses that is not due to searches is considered the application-level overhead and the HTTP protocol header is considered the protocol level overhead. Therefore, if the HTTP protocol header overhead supporting the fraction of accesses due to searches is 10% and the effectiveness of crawling of the Web site is 80%, then the overall application-level utility metric becomes 72%.

In another embodiment of the present invention, using email client application with spam filter as an example application, a significant fraction of emails today is contributed by spam. Yet there is no single metric that indicates what fraction of email received on a per-user or per-site basis that is spam. The only available metric is the fraction of email that is blocked at the Internet Service Provider (ISP) level via spam blocking programs. This does not take into account false positives or phishing attempts. The application-level utility metric can be defined by taking into consideration of the efficiency of the email client by taking into account of false positives, phishing attempts, and even recipient-rated usefulness for each email received to classify the usefulness of emails received as well as the Simple Mail Transfer Protocol (SMTP) protocol header overhead involved in the traffic exchange supporting the email client application.

Email spam is the sending of nearly identical messages to a large number of recipients from an unsolicited source. Phishing is a criminal activity that attempts to fraudulently acquire sensitive information, such as passwords and credit card details, by masquerading as a trustworthy person or business in an electronic communication.

To illustrate the difference between using only the SMTP protocol header overhead and the application-level utility metric to characterize the email client efficiency, the protocol overhead introduced by the SMTP protocol is quite low, e.g., 10%. If we use only protocol header overhead of the SMTP protocol to compute the email client efficiency, the result is simply 90%. Now, if we take into account of email spam, false positives, and phishing attempts at the application-level, the application-level efficiency may only be 50%, assuming only half of the email traffic is useful to the end user. The overall application-level utility metric of the email client becomes only 45%, in terms of efficiency. In addition, using the defined application-level utility metric, the overall efficiency of different implementations of email client applications with spam filter can be accurately compared.

Furthermore, note that email application used to receive emails requires the use of multiple underlying protocols in addition to the Simple Mail Transfer Protocol (SMTP). For instance, an email client application uses SMTP to retrieve emails from a mail server. The application may also need to use DNS to resolve the IP address of the SMTP server. Thus, both SMTP and DNS protocols may require the use of further underlying protocols such as TCP, UDP, and IP. There is additional protocol overhead in the underlying protocols, such as DNS, TCP and IP, supporting the email client application using the SMTP protocol.

Figure 2:
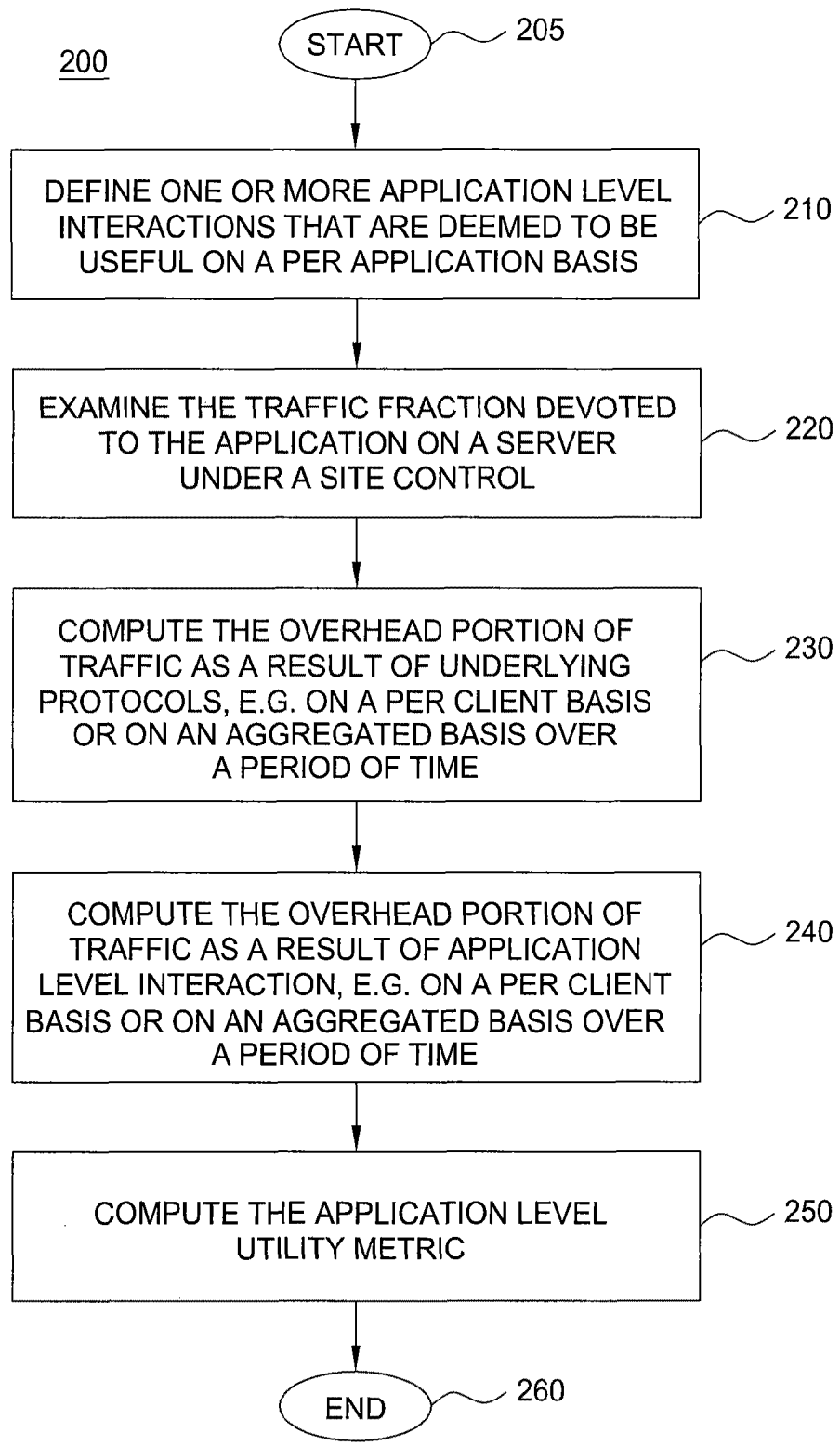
FIG. 2 illustrates a flowchart of a method for computing application-level utility metric of the present invention.

FIG. 2 illustrates a flowchart of a method 200 for computing application-level utility metric of the present invention. Method 200 starts in step 205 and proceeds to step 210.

In step 210, the method defines the type of application-level interactions that are deemed to be useful for a particular application. The type of application-level interactions that is deemed to be useful is selectively defined by a user depending on application type and user requirements. For instance, for an email client application, the type of application-level interaction that is deemed to be useful can be emails received using the SMTP protocol that are not spam, phishing attempts, or false positives.

In step 220, the method examines the traffic fraction devoted to the application on a server under a site control by using the server logs. For example, all the application-level interactions defined in step 210 can be identified by examining server logs.

In step 230, the method computes the overhead portion of traffic as a result of one or more key underlying protocols used by the application. For instance, if the application-level interactions require HTTP traffic exchanges, the amount of protocol overhead associated with the HTTP traffic exchanges are computed; hence, the efficiency of the underlying protocols used can also be computed. For example, if it is determined that 100 bytes of traffic is devoted to a particular application and 10 bytes of the 100 bytes are determined to be protocol overhead, then the efficiency value is deemed to be 0.9 ((100−10)/100)). The actual protocol traffic details for each protocol and all the underlying protocols can be obtained using method 300 as shown and discussed below in FIG. 3.

In step 240, the method computes the overhead portion of the traffic as a result of the application-level interactions defined in step 210; hence, the efficiency of the application-level interactions can be computed. It should be noted that the overhead portion of the traffic as a result of the application-level interactions is basically the non-useful portion of the traffic as defined by a user. For instance, for a Web server application, the application-level overhead can be defined to be the fraction of requests that are for either non-existent servers or non-existent resources. For example, if it is determined that 100 bytes of traffic is devoted to a particular application and 40 bytes of the 100 bytes are determined to be application-level overhead, then the efficiency value is deemed to be 0.6 ((100−40)/100)).

In step 250, the method computes the application-level utility metric by multiplying the efficiency values obtained in step 230 and step 240. For example, the application-level utility metric for the above example can be computed as 0.9×0.6=0.54. Note that such a metric would be the lower bound: there may be external wastage of traffic on the part of the client that is invisible to the server. Also such a metric does not have to be computed on a per-client basis but could be aggregated over a period of time and across clients. Such a smoothing would allow for variations seen across clients. The method ends in step 260.

Figure 3:
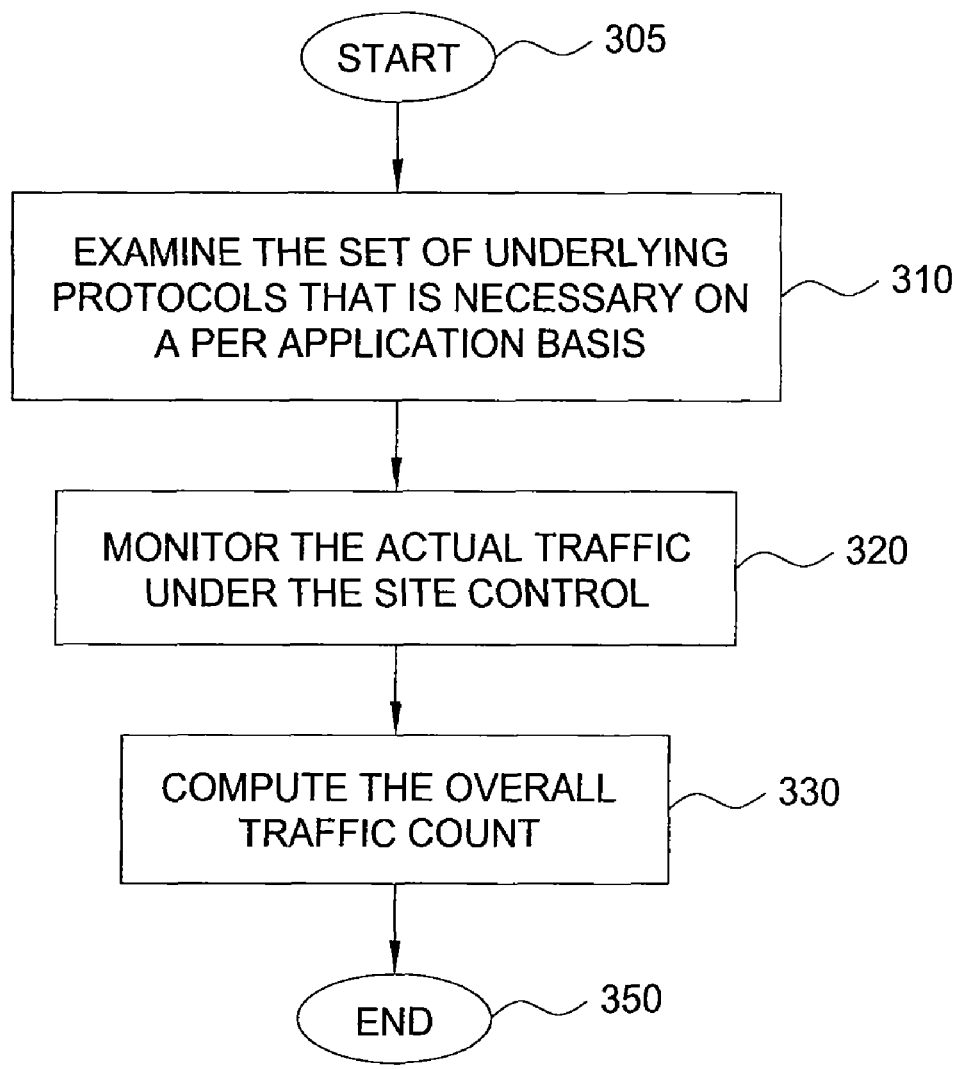
FIG. 3 illustrates a flowchart of a method for computing the overall traffic associated with an application related to the present invention.

FIG. 3 illustrates a flowchart of a method 300 for computing the overall traffic associated with an application related to the present invention. Method 300 starts in step 305 and proceeds to step 310.

In step 310, the method examines the set of all underlying protocols that is necessary to support the functionality a particular application. In one embodiment, underlying protocols include all Internet Protocol suite protocols at layer 3 and above. For instance, layer 3, the network layer, Internet based protocols include, but are not limited to, IP and Internet Control Message Protocol (ICMP); layer 4, the transport layer, Internet based protocols include, but are not limited to, TCP, UDP, and Resource Reservation Protocol (RSVP); and layer 5, the application layer, Internet based protocols include, but are not limited to, HTTP, DNS, SMTP, File Transfer Protocol (FTP), and Session Initiation Protocol (SIP) just to name a few.

In step 320, the method monitors the actual traffic count such as, but not limited to, the number of packets, the number of bytes, the amount of bandwidth for each underlying protocols examined in step 310. In addition, the computation resources consumed by each underlying protocols, such as, but not limited to, Computer Processing Unit (CPU) utilization, storage utilization, memory utilization can also be monitored.

In step 330, the method computes the overall traffic count associated with the application. Note that the overall traffic count for a particular application includes protocol traffic necessitated by one or more underlying protocols such as DNS lookups etc. The method ends in step 350.

Figure 4:
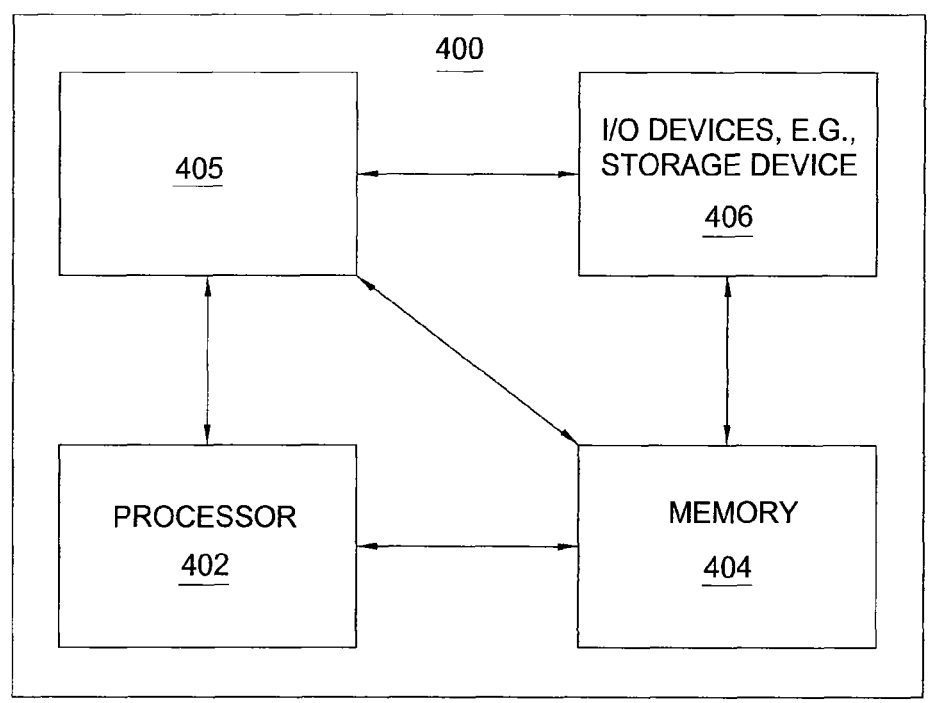
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing an application-level utility metric, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing an application-level utility metric can be loaded into memory 404 and executed by processor 402 to implement the functions as discussed above. As such, the present process 405 for providing an application-level utility metric (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an application-level utility metric for an application, comprising:
   computing by a processor a protocol overhead of a plurality of underlying internet protocol suite protocols supporting the application;
   computing by the processor an application-level overhead based on an application-level interaction, wherein the application-level interaction comprises a client-server based interaction, and wherein the computing the application-level overhead comprises computing a fraction of traffic at an application-level of the application that comprises requests for non-existent resources; and
   computing by the processor the application-level utility metric in accordance with the protocol overhead and the application-level overhead, wherein the application-level utility metric is computed by multiplying a first efficiency value derived from the protocol overhead with a second efficiency value derived from the application-level overhead.

2. The method of claim 1, wherein the Internet protocol suite protocols comprise: a network layer protocol, a transport layer protocol, and an application layer protocol.

3. The method of claim 1, wherein a presence of the application-level interaction is determined by examining system logs from a client system.

4. The method of claim 1, wherein the computing the protocol overhead comprises:
   computing a fraction of traffic due to a protocol header and a fraction of traffic due to a data portion of the underlying internet protocol suite protocols.

5. The method of claim 4, wherein the fraction of traffic due to the protocol header and the fraction of traffic due to the data portion of the underlying internet protocol suite protocols are obtained by monitoring actual traffic exchanged by the application.

6. The method of claim 4, wherein the protocol overhead and the application-level overhead are computed on a per client basis.

7. The method of claim 1, wherein the protocol overhead and the application-level overhead are computed on an aggregated basis over a period of time.

8. A non-transitory computer-readable medium having stored thereon a plurality of instructions, the plurality of instructions including instructions which, when executed by a processor, cause the processor to perform a method for providing an application-level utility metric for an application, comprising:
   computing a protocol overhead of a plurality of underlying internet protocol suite protocols supporting the application;
   computing an application-level overhead based on an application-level interaction, wherein the application-level interaction comprises a client-server based interaction, and wherein the computing the application-level overhead comprises computing a fraction of traffic at an application-level of the application that comprises requests for non-existent resources; and
   computing the application-level utility metric in accordance with the protocol overhead and the application-level overhead, wherein the application-level utility metric is computed by multiplying a first efficiency value derived from the protocol overhead with a second efficiency value derived from the application-level overhead.

9. The non-transitory computer-readable medium of claim 8, wherein the Internet protocol suite protocols comprise: a network layer protocol, a transport layer protocol, and an application layer protocol.

10. The non-transitory computer-readable medium of claim 8, wherein the computing the protocol overhead comprises:
    computing a fraction of traffic due to a protocol header and a fraction of traffic due to a data portion of the underlying internet protocol suite protocols.

11. The non-transitory computer-readable medium of claim 10, wherein the fraction of traffic due to the protocol header and the fraction of traffic due to the data portion of the underlying Internet protocol suite protocols are obtained by monitoring actual traffic exchanged by the application.

12. The non-transitory computer-readable medium of claim 10, wherein the protocol overhead and the application-level overhead are computed on a per client basis.

13. The non-transitory computer-readable medium of claim 10, wherein the protocol overhead and the application-level overhead are computed on an aggregated basis over a period of time.

14. An apparatus for providing an application-level utility metric for an application, comprising:
    a processor, wherein the processor is configured to:
        compute a protocol overhead of a plurality of underlying internet protocol suite protocols supporting the application;
        compute an application-level overhead based on an application-level interaction, wherein the application-level interaction comprises a client-server based interaction, and wherein the computing the application-level overhead comprises computing a fraction of traffic at an application-level of the application that comprises requests for non-existent resources; and
        compute the application-level utility metric in accordance with the protocol overhead and the application-level overhead, wherein the means for computing the application-level utility metric computes the application-level utility metric by multiplying a first efficiency value derived from the protocol overhead with a second efficiency value derived from the application-level overhead.

* * * * *